United States Patent
Li

(10) Patent No.: US 11,445,086 B2
(45) Date of Patent: Sep. 13, 2022

(54) METHOD AND DEVICE FOR CONTROLLING IMAGE-FORMING DEVICES, AND ELECTRONIC TERMINAL THROUGH NETWORK USING THE METHOD

(71) Applicant: Zhuhai Pantum Electronics Co., Ltd., Zhuhai (CN)

(72) Inventor: Jiade Li, Zhuhai (CN)

(*) Notice: Subject to any disclaimer, the term of this patent is extended or adjusted under 35 U.S.C. 154(b) by 0 days.

(21) Appl. No.: 17/026,829

(22) Filed: Sep. 21, 2020

(65) Prior Publication Data

US 2021/0006684 A1 Jan. 7, 2021

Related U.S. Application Data

(63) Continuation of application No. PCT/CN2019/077751, filed on Mar. 12, 2019.

(30) Foreign Application Priority Data

Apr. 12, 2018 (CN) .......................... 201810325658.8

(51) Int. Cl.
*H04W 76/10* (2018.01)
*H04W 12/71* (2021.01)
(Continued)

(52) U.S. Cl.
CPC ..... *H04N 1/32765* (2013.01); *H04N 1/00307* (2013.01); *H04N 1/32786* (2013.01);
(Continued)

(58) Field of Classification Search
CPC ........... H04N 1/32765; H04N 1/00307; H04N 1/32786; H04N 2201/0055;
(Continued)

(56) References Cited

U.S. PATENT DOCUMENTS 10,091,827 B2 * 10/2018 Lee .................. H04W 76/14
2005/0157333 A1 7/2005 Cho et al.
(Continued)

FOREIGN PATENT DOCUMENTS

CN 1778073 A 5/2006
CN 1791044 A 6/2006
(Continued)

OTHER PUBLICATIONS

The World Intellectual Property Organization (WIPO) International Search Report for PCT/CN2019/077751 dated Jun. 3, 2019 7 Pages (including translation).
(Continued)

*Primary Examiner* — Juan M Guillermety
(74) *Attorney, Agent, or Firm* — Anova Law Group, PLLC

(57) ABSTRACT

A method and a device for controlling image-forming devices, and an electronic terminal using the method are provided in the present disclosure. The method includes acquiring currently-available wireless networks; when a wireless network is provided by an image-forming device, acquiring a first network identifier of the wireless network; when a wireless network is not provided by the image-forming device, connecting to the wireless network and acquiring a first device identifier of the image-forming device connected to the wireless network; adding the first network identifier and the first device identifier acquired to the list of the image-forming devices; according to the list of the image-forming devices, selecting a target image-forming device; and connecting to a wireless network corresponding to the target image-forming device and establishing a communication with the target image-forming device, thereby controlling the target image-forming device to execute an image-forming task.

20 Claims, 10 Drawing Sheets

(51) Int. Cl.
*H04N 1/00* (2006.01)
*H04N 1/327* (2006.01)
*H04W 8/00* (2009.01)

(52) U.S. Cl.
CPC ........... *H04W 8/005* (2013.01); *H04W 12/71* (2021.01); *H04W 76/10* (2018.02); *H04N 2201/0055* (2013.01)

(58) Field of Classification Search
CPC .. H04N 1/00315; H04W 8/005; H04W 12/71; H04W 76/10; H04W 12/06; H04W 12/50; H04L 67/16; H04L 67/1021
See application file for complete search history.

(56) References Cited

U.S. PATENT DOCUMENTS

| | | | |
|---|---|---|---|
| 2009/0215404 A1* | 8/2009 | Kesavan | H04W 48/18 455/73 |
| 2010/0123932 A1 | 5/2010 | Nakamura | |
| 2011/0200025 A1* | 8/2011 | Goto | H04W 76/19 370/338 |
| 2012/0019864 A1 | 1/2012 | Mickeleit et al. | |
| 2012/0076117 A1* | 3/2012 | Montemurro | H04W 12/088 370/338 |
| 2012/0178488 A1* | 7/2012 | Jonker | H04W 8/005 455/517 |
| 2014/0006633 A1* | 1/2014 | Uchikawa | H04W 76/14 709/227 |
| 2014/0302842 A1* | 10/2014 | Lloyd | H04W 12/30 455/426.1 |
| 2016/0302060 A1* | 10/2016 | Agardh | H04W 12/50 |
| 2016/0381722 A1* | 12/2016 | Konji | H04W 76/14 370/329 |
| 2017/0109110 A1 | 4/2017 | Kitagata et al. | |
| 2017/0123739 A1* | 5/2017 | Konji | H04W 76/14 |
| 2017/0290071 A1* | 10/2017 | Ito | H04W 76/14 |
| 2018/0048785 A1* | 2/2018 | Shibata | H04W 76/14 |
| 2018/0132167 A1* | 5/2018 | Zhang | H04W 12/06 |
| 2018/0210688 A1* | 7/2018 | Hattan | G06F 3/1226 |
| 2018/0248871 A1* | 8/2018 | Tsirkin | H04W 12/06 |
| 2018/0263069 A1* | 9/2018 | Numakami | H04W 76/10 |
| 2019/0274082 A1* | 9/2019 | Vemuri | H04W 36/0022 |

FOREIGN PATENT DOCUMENTS

| | | |
|---|---|---|
| CN | 101681241 A | 3/2010 |
| CN | 103763450 A | 4/2014 |
| CN | 104254844 A | 12/2014 |
| CN | 104636092 A | 5/2015 |
| CN | 108259696 A | 7/2018 |

OTHER PUBLICATIONS

The China National Intelleectual Property Administration (CNIPA) the China Search Report for 201810325658.8 dated Mar. 20, 2019 6 page.

\* cited by examiner

METHOD AND DEVICE FOR CONTROLLING IMAGE-FORMING DEVICES, AND ELECTRONIC TERMINAL THROUGH NETWORK USING THE METHOD

CROSS-REFERENCE TO RELATED APPLICATIONS

This application is a continuation of International Application No. PCT/CN2019/077751, filed on Mar. 12, 2019, which claims priority of Chinese Patent Application No. 201810325658.8, filed with the State Intellectual Property Office of P. R. China on Apr. 12, 2018, the entire contents of all of which are incorporated herein by reference.

TECHNICAL FIELD

The present disclosure generally relates to the field of image-forming device control technology and, more particularly, relates to a method and a device for controlling image-forming devices, and an electronic terminal.

BACKGROUND

Image-forming devices may include printers, copiers, fax machines, scanners, and multifunction all-in-one machines which integrate functions including printing, copying, faxing, and scanning and may be configured to print images or texts on image-forming media. A communication module is disposed in the image-forming device, which may be connected to a router or other network access points through a wireless network. The image-forming device itself may also be configured as a network access point, which is called a hotspot image-forming device. An electronic terminal may be directly connected to the hotspot image-forming device or be connected to the image-forming device through a router. A user may, through an application program installed on the electronic terminal, control the image-forming device to perform image-forming tasks such as printing and the like.

When the electronic terminal receives instructions of searching the image-forming devices from the user through the application program, the electronic terminal may search nearby network access points. When the quantity of the network access points is more than one, the electronic terminal may establish the connection with each network access point sequentially and acquire the device identifier of the image-forming device connected to the network access point; and the device identifiers of the image-forming devices obtained from all network access points may be displayed on the electronic terminal through a list for the user's viewing and selection.

When the quantity of the network access points is relatively large, the electronic terminal may go through the process of network connection, device identifier acquisition, and network disconnection with each network access point, which may result in a relatively long search time and inconvenience for the user to select a target image-forming device by comparing each list of the image-forming devices.

SUMMARY

One aspect of the present disclosure provides a method for controlling image-forming devices. The method includes:
acquiring currently-available wireless networks;
searching image-forming devices through the currently-available wireless networks and establishing a list of the image-forming devices;
according to the list of the image-forming devices, selecting a target image-forming device; and
connecting to a wireless network corresponding to the target image-forming device and establishing a communication with the target image-forming device, thereby controlling the target image-forming device to execute an image-forming task;
where searching the image-forming devices through the currently-available wireless networks and establishing the list of the image-forming devices include:
when a wireless network is provided by an image-forming device, acquiring a first network identifier of the wireless network;
when a wireless network is not provided by the image-forming device, connecting to the wireless network and acquiring a first device identifier of the image-forming device connected to the wireless network; and
adding the first network identifier and the first device identifier acquired to the list of the image-forming devices.

Another aspect of the present disclosure provides an electronic terminal, including:
a memory, for storing a computer program; and
a processor, coupled to the memory and, when the computer program being executed, configured to:
acquire currently-available wireless networks;
search image-forming devices through the currently-available wireless networks, and establish a list of the image-forming devices, by performing:
when a wireless network is provided by an image-forming device, acquiring a first network identifier of the wireless network; when a wireless network is not provided by the image-forming device, connecting to the wireless network and acquiring a first device identifier of the image-forming device connected to the wireless network; and adding the first network identifier and the first device identifier acquired to the list of the image-forming devices;
according to the list of the image-forming devices, select a target image-forming device;
connect to a wireless network corresponding to the target image-forming device; and
establish a communication with the target image-forming device, thereby controlling the target image-forming device to execute an image-forming task.

Another aspect of the present disclosure provides a non-transitory computer-readable storage medium, containing program instructions for, when executed by a processor, performing a method for controlling image-forming devices, the method comprising:
acquiring currently-available wireless networks;
searching image-forming devices through the currently-available wireless networks and establishing a list of the image-forming devices;
according to the list of the image-forming devices, selecting a target image-forming device; and
connecting to a wireless network corresponding to the target image-forming device and establishing a communication with the target image-forming device, thereby controlling the target image-forming device to execute an image-forming task;
where searching the image-forming devices through the currently-available wireless networks and establishing the list of the image-forming devices include:

when a wireless network is provided by an image-forming device, acquiring a first network identifier of the wireless network;

when a wireless network is not provided by the image-forming device, connecting to the wireless network and acquiring a first device identifier of the image-forming device connected to the wireless network; and adding the first network identifier and the first device identifier acquired to the list of the image-forming devices.

Another aspect of the present disclosure provides a device for controlling image-forming devices. The device includes:

a wireless network acquisition module, configured to acquire currently-available wireless networks;

an image-forming device search module, configured to search image-forming devices through the currently-available wireless networks;

a device list establishment module, configured to establish a list of the image-forming devices;

an image-forming device selection module, configured to, according to the list of the image-forming devices, select a target image-forming device;

a network connection module, configured to connect to a wireless network corresponding to the target image-forming device;

an image-forming device control module, configured to establish a communication with the target image-forming device, thereby controlling the target image-forming device to execute an image-forming task;

where the image-forming device search module includes:

a network identifier acquisition unit, configured to, when a wireless network is provided by an image-forming device, acquire a first network identifier of the wireless network; and a device identifier acquisition unit, configured to, when a wireless network is not provided by the image-forming device, connect to the wireless network and acquire a first device identifier of the image-forming device connected to the wireless network, where the device list establishment module is configured to add the first network identifier and the first device identifier acquired to the list of the image-forming devices.

For the above-mentioned device for controlling image-forming devices, the network connection module includes:

a network switch unit, configured to, when the wireless network corresponding to the target image-forming device is not consistent with a currently-connected wireless network, disconnect the currently-connected wireless network and switch to connecting to the wireless network corresponding to the target image-forming device.

For the above-mentioned device for controlling image-forming devices, the network connection module further includes:

a network change unit, configured to, according to a predetermined network switching strategy, switch from connecting to the wireless network corresponding to the target image-forming device to connecting to a target wireless network.

The above-mentioned device for controlling image-forming devices further includes:

a first record module, configured to, before searching the image-forming devices, record a second network identifier of the currently-connected wireless network;

where the network change unit is configured to:

acquire a wireless network corresponding to a currently-recorded second network identifier as the target wireless network; and when a predetermined condition is satisfied, disconnect the wireless network corresponding to the target image-forming device; and establish a connection with the target wireless network.

For the above-mentioned device for controlling image-forming devices, the network change unit is configured to:

acquire a wireless network with a strongest signal in all wireless networks as the target wireless network; and when a predetermined condition is satisfied, disconnect the wireless network corresponding to the target image-forming device; and establish a connection with the target wireless network.

For the above-mentioned device for controlling image-forming devices, the network change unit is configured to:

when a predetermined condition is satisfied, establish and display the list of the wireless networks, where the list of the wireless networks includes the currently-available wireless networks;

acquire a wireless network selected by a user from the list of the wireless networks as the target wireless network; and disconnect the wireless network corresponding to the target image-forming device and establish a connection with the target wireless network.

The above-mentioned device for controlling image-forming devices further includes:

a second record module, configured to record a second device identifier of the target image-forming device and a third network identifier of the wireless network corresponding to the target image-forming device; and a communication status determination module, configured to, before searching the image-forming devices, determine whether a communication is able to be established with the target image-forming device corresponding to the recorded second device identifier through the wireless network corresponding to the third network identifier, where when a determination result is "yes", the network connection module is configured to be connected to the wireless network corresponding to the third network identifier, and the image-forming device control module is configured to establish the communication with the target image-forming device corresponding to the recorded second device identifier, thereby controlling the target image-forming device to execute the image-forming task; and when the determination result is "no", the wireless network acquisition module is configured to acquire the currently-available wireless networks and the image-forming device search module is configured to search the image-forming devices through the wireless networks; and when the device list establishment module identifies the first device identifier corresponding to a searched image-forming device to be same as the recorded second device identifier, the image-forming device selection module is configured to automatically select the recorded target image-forming device as the target image-forming device from selected target image-forming devices.

In the technical solutions provided by the present disclosure, by acquiring the currently-available wireless networks, when the wireless network is identified as the wireless network provided by the image-forming device, the network identifier for the wireless network may be directly acquired as the virtual device identifier of the image-forming device providing the wireless network; when the wireless network is identified as the wireless network not provided by the image-forming device, the connection may be established with the wireless network and then the device identifier of the image-forming device connected to the wireless network may be acquired as the first device identifier for representing the image-forming device itself; and then the list of the image-forming devices including the first network identifier and the first device identifier may be established, the wireless network corresponding to the target image-forming device may be connected after selecting the target image-forming device from the list of the image-forming devices, and the communication may be established with the target image-forming device, thereby controlling the target image-forming device to perform the image-forming tasks. Since the first network identifier can be acquired from the broadcast message of the wireless network as the virtual device identifier when the wireless network provided by the image-forming device is identified, there is no need to establish the connection with the wireless network, which may reduce the quantity of wireless network connection and disconnection and shorten the search time of the image-forming devices to improve efficiency.

BRIEF DESCRIPTION OF THE DRAWINGS

The drawings herein are incorporated into the specification and constitute a part of the specification. The drawings illustrate embodiments in accordance with the present disclosure, and together with the specification are used to explain the principle of the present disclosure.

DETAILED DESCRIPTION

In order to clearly illustrate the objectives, technical solutions and advantages of the embodiments of the present disclosure, the technical solutions in the embodiments of the present disclosure are described clearly and completely in conjunction with the accompanying drawings in the embodiments of the present disclosure. Obviously, the described embodiments are part of the embodiments of the present disclosure, rather than all of the embodiments. Based on the embodiments of the present disclosure, all other embodiments obtained by those skilled in the art without creative work shall fall within the protection scope of the present disclosure.

Exemplary Embodiment One

A method for controlling image-forming devices is provided in one embodiment, which may be applied to the control of the image-forming devices. The method may be executed by an electronic terminal, such as a computer, a mobile phone, a tablet computer, a digital camera, and the like. In one embodiment, a mobile phone is merely taken as an example to describe the method for controlling the image-forming devices in detail. The method provided in one embodiment may also be applied to other electronic terminals.

A communication module is disposed in the mobile phone, which may be configured to exchange data with other communication devices through a wireless network. Application software is installed on the mobile phone, the device identifier of the image-forming device may be obtained and the communication with the image-forming device may be established through the application software, and the application software may control the image-forming device to execute image-forming tasks.

Figure 1:
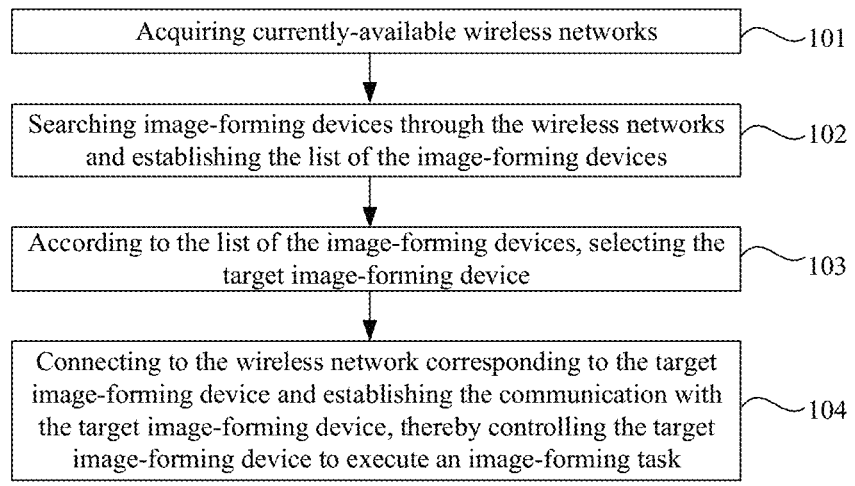
FIG. 1 illustrates a flow chart of a method for controlling image-forming devices provided by the exemplary embodiment one of the present disclosure.

The control method provided in one embodiment may be executed by a processor in the mobile phone. FIG. 1 illustrates a flow chart of a method for controlling image-forming devices provided by the exemplary embodiment one of the present disclosure. As shown in FIG. 1, the method for controlling the image-forming devices provided in one embodiment may include the following.

At step 101, currently-available wireless networks may be acquired.

At step 102, image-forming devices may be searched through the wireless networks, and a list of the image-forming devices may be established.

At step 103, a target image-forming device may be selected according to the list of the image-forming devices.

At step 104, the wireless network corresponding to the target image-forming device may be connected, and a communication may be established with the target image-forming device, thereby controlling the target image-forming device to execute image-forming tasks.

The wireless communication module in the mobile phone may detect nearby wireless networks. Step 101 may specifically be acquiring broadcast information transmitted by each wireless access point by the wireless communication module. The broadcast information may contain the network identifier (e.g., server set identifier) of the wireless network where each wireless access point is located. The wireless networks may mainly include two types. One type may be the wireless networks provided by the image-forming devices. The units in the wireless networks provided by the image-forming devices may be connected to each other without wireless routers. Such wireless network type may generally include the wireless networks formed by using the image-forming devices as wireless access points or soft APs. The image-forming devices may generally be called hotspot image-forming devices. Such wireless network type may also include Wi-Fi direct wireless networks established between the image-forming devices and other external devices. At this point, the image-forming devices may be used as group owners (GO) and called direct connection image-forming devices. The network identifier of the wireless network provided by the image-forming device may generally carry the device identifier of the image-forming device; or the network identifier of the wireless network provided by the image-forming device may be named by the device identifier of the image-forming device. The device identifier may be a model, a serial number, or other content used to label the image-forming device. Furthermore, the network identifier of the wireless network provided by the image-forming device may also generally contain certain special characters, such as direct connection, AP, direct, and the like. Moreover, another wireless network type may be formed by other network switch devices such as routers and the like. At least one image-forming device may be connected to the wireless networks formed by the network switch devices, and each image-forming device may be used as a station.

Figure 2:
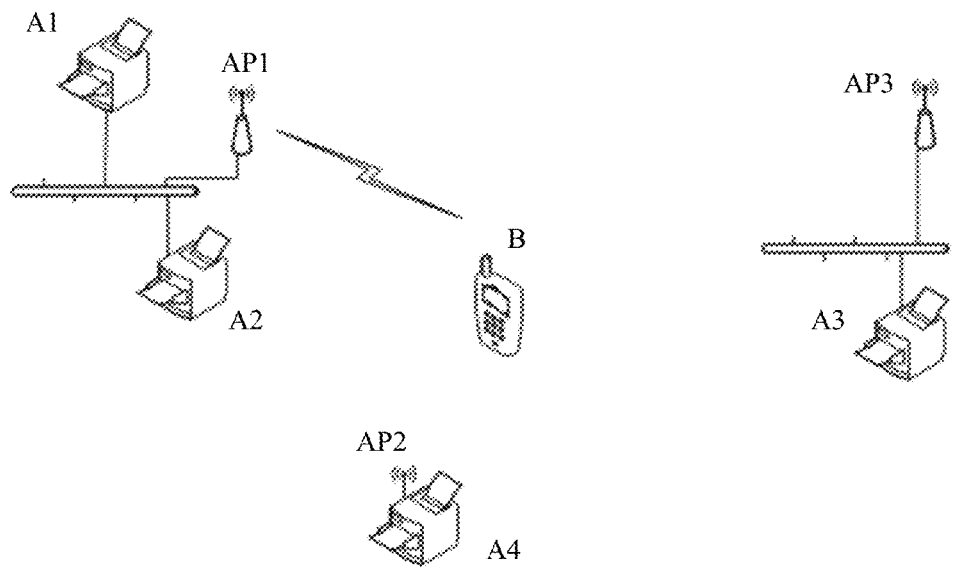
FIG. 2 illustrates a structural schematic of image-forming devices and corresponding wireless networks provided by the exemplary embodiment one of the present disclosure.

FIG. 2 illustrates a structural schematic of image-forming devices and corresponding wireless networks provided by the exemplary embodiment one of the present disclosure. Three wireless networks AP1, AP2, and AP3 are shown in FIG. 2. AP1 and AP3 are not the wireless networks provided by the image-forming devices. Two image-forming devices A1 and A2 are connected to AP1, and one image-forming device A3 is connected to AP3. AP2 is the wireless network provided by the image-forming device. A mobile phone B may receive the broadcast messages transmitted by three wireless networks AP1, AP2, and AP3.

After acquiring the currently-available wireless networks, the type of the wireless network may be determined according to the broadcast message of the wireless network. Specifically, whether the wireless network corresponding to a network identifier is the wireless network provided by the image-forming device may be identified by determining whether the broadcast massage or the network identifier includes the device identifier of the image-forming device or a special character.

Figure 3:
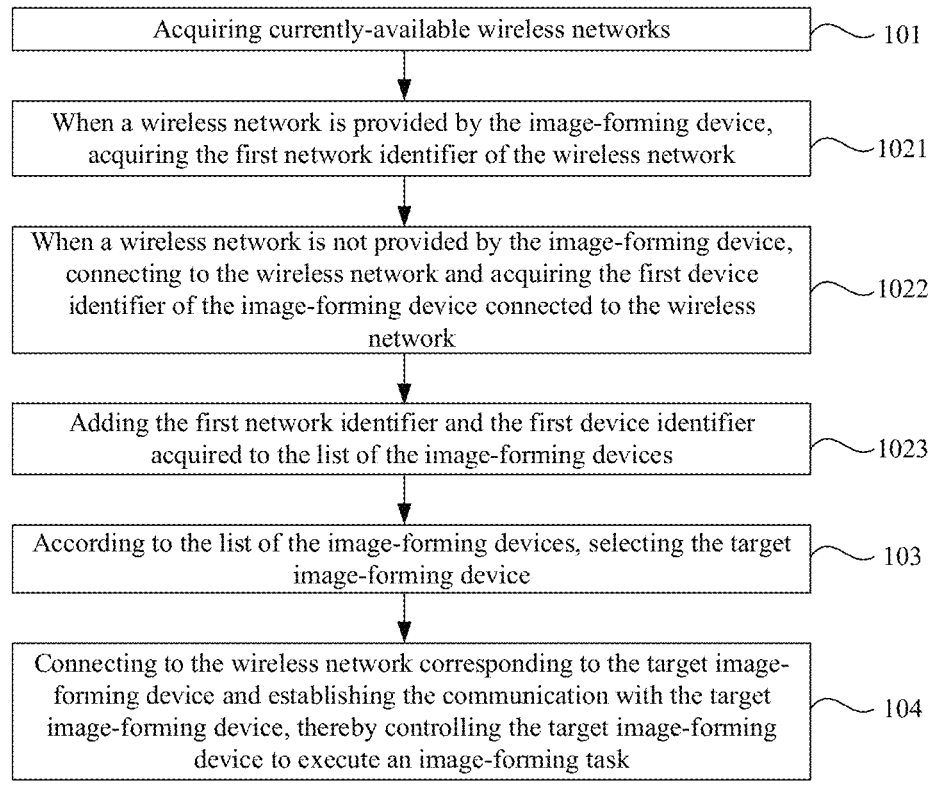
FIG. 3 illustrates a flow chart of another method for controlling image-forming devices provided by the exemplary embodiment one of the present disclosure.

FIG. 3 illustrates a flow chart of another method for controlling image-forming devices provided by the exemplary embodiment one of the present disclosure. As shown in FIG. 3, step 102 is to search for the image-forming device connected to each wireless network, which may specifically include the following steps.

At step 1021, when the wireless network is provided by the image-forming device, a first network identifier of the wireless network may be acquired.

When the wireless network is determined as the wireless network provided by the image-forming device, since the network identifier of the wireless network carries the device identifier of the image-forming device or a special character, the network identifier may be directly used as a virtual device identifier of the image-forming device and added to the list of the image-forming devices. The process of connecting to the wireless network provided by the image-forming device and then acquiring the device identifier of the image-forming device may no longer be required. For example, when receiving the broadcast message of AP2, the information of the device identifier of the image-forming device A4 acquired from the broadcast message of the wireless network AP2 may be used as the first network identifier. It is also possible to use the service set identifier (SSID) of the wireless network AP2 as the first network identifier, and the SSID may be virtualized as the device identifier of the image-forming device A4 and added to the list of the image-forming devices to provide selection for the user.

At step 1022, when the wireless network is not provided by the image-forming device, the wireless network may be connected, and the first device identifier of the image-forming device connected to the wireless network may be acquired.

When the wireless network is determined as the wireless network not provided by the image-forming device, the connection may be established with the wireless network, and the device identifier of each image-forming device, serving as the station, connected to the wireless network may be acquired as the first device identifier.

When the quantity of the wireless networks provided by non-image-forming devices is more than one, for each wireless network, the connection may be established, the device identifier of each image-forming device connected to the wireless network may be acquired, then the connection may be disconnected, and the connection may be established with a next wireless network. For example, the connection may be first established with AP1 and the device identifiers of the image-forming devices A1 and A2 may be acquired, and the connection may then be established with AP3 and the device identifier of the image-forming device A3 may be acquired. The order of connecting AP1 and AP3 may not be sequential.

At step 1023, the first network identifier and the first device identifier acquired may be added to the list of the image-forming devices.

In one embodiment, the first network identifier and the first device identifier acquired from the wireless network may be added to the list of the image-forming devices, which is convenient for the user to select the image-forming devices. Meanwhile, in order to further save the time of searching the image-forming devices, when the first device identifiers are acquired, a predetermined quantity of top wireless networks may be sequentially connected according the signal strength in the plurality of wireless networks provided by existing non-image-forming devices, thereby acquiring the first device identifiers of the image-forming devices. For example, a mobile phone B may receive the broadcast messages of AP1 and AP3, but the communication signal of AP3 may be relatively weak. Therefore, the mobile phone B is only allowed to establish the connection with AP1 to search the image-forming devices, which may prevent the search time from being too long and avoid searching for distant wireless networks.

Figure 4:
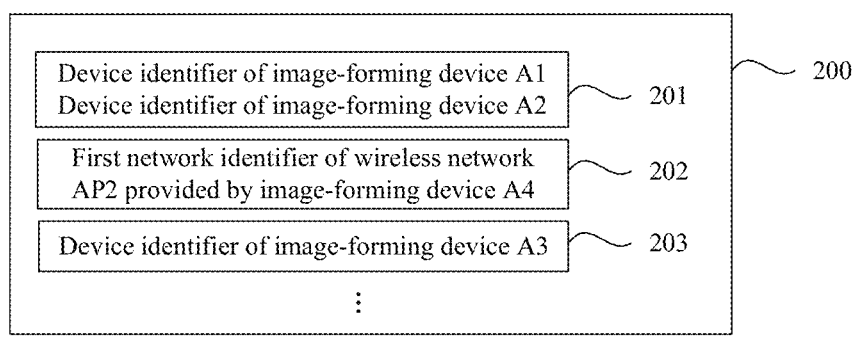
FIG. 4 illustrates a schematic of a list of image-forming devices provided by the exemplary embodiment one of the present disclosure.

FIG. 4 illustrates a schematic of the list of image-forming devices provided by the exemplary embodiment one of the present disclosure. As shown in FIG. 4, the list of the image-forming devices 200 may include a first display region 201, a second display region 202, and a third display region 203. The first display region 201 may display the device identifiers of the image-forming devices A1 and A2 connected to AP1; the second display region 202 may display the first network identifier of the wireless network AP2 provided by the image-forming device A4; and the third display region 203 may display the device identifier of the image-forming device A2 connected to AP3.

When the first network identifier is selected from the list of the image-forming devices at step 103, the wireless network corresponding to the first network identifier may be connected, the target image-forming device may be searched in the wireless network corresponding to the first network identifier, the device identifier of the target image-forming device may be acquired, and the communication with the target image-forming device may be established at step 104. For example, the image-forming device A4 is selected in FIG. 4, so that the communication module of the mobile phone may be connected to AP2, the image-forming device A4 may be searched in AP2, and the device identifier of the image-forming device A4 may be acquired and displayed in the application software of the mobile phone. The device identifier of the image-forming device A4 may be certain unchangeable device name or other information configured in the device by a manufacturer, but the network identifier of the wireless network provided by the image-forming device A4 may be a pre-default network identifier which generally includes the device identifier of the image-forming device or a special character. However, the network identifier may be modified subsequently. To facilitate searching the image-forming device, the user may modify the network identifier of the wireless network provided by the image-forming device to make the network identifier same as the device identifier of the image-forming device. Therefore, by acquiring the first network identifier as the virtual device identifier of the image-forming device, the time for searching the image-forming device may be reduced.

The list of the image-forming devices includes the image-forming devices which can be searched in the currently-available wireless network and displayed to the user through the list. The user may select the target image-forming device from the list and may not need to manually switch connecting the plurality of wireless networks to select the target image-forming device, thereby improving the convenience.

At step 102, after the list of the image-forming devices is established, the signal strength of each wireless network may also be acquired, and the image-forming devices may be sorted according to signal strength. The image-forming device identifiers associated with the wireless networks may be sorted in the order of signal strength from strong to weak, such that the image devices associated with the wireless networks with strong signals may be displayed at the top of the list of the image-forming devices, which is convenient for the user to select the image-forming devices. When the quantity of the wireless networks and associated image-forming devices is relatively large, only the identifiers of the wireless networks with strong signals and associated image-forming devices may be included in the list of the image-forming devices, and the wireless networks with weak signals and associated image-forming devices may be ignored, which may also shorten the length of the list of the image-forming devices and improve the user selection convenience and speed.

Normally, the user prefers to select the hotspot image-forming device, and the first network identifier corresponding to the hotspot image-forming device may also be configured at the top of the list of the image-forming devices.

In the above-mentioned step 103, the target image-forming device may be selected according to the list of the image-forming devices and acquired according to the user's operation. The target image-forming device may also be automatically selected.

Acquiring the target image-forming device according to the user's operation may specifically be selecting one first device identifier or first network identifier from the list of the image-forming devices and using the image-forming device corresponding to selected identifier as the target image-forming device.

Automatically selecting the target image-forming device may specifically be acquiring the network signal strength of each currently-available wireless network and selecting the image-forming device associated with the wireless network with the strongest network signal as the target image-forming device. Or, when certain wireless networks in all wireless networks require the user to enter a password to be connected, the image-forming device associated with the wireless network which can be connected without a password may be automatically selected as the target image-forming device. Or, when the device identifier of only one image-forming device is acquired, the image-forming device may be automatically connected. Or, when only one first network identifier is in the list of the image-forming devices, the wireless network corresponding to the first network identifier may be automatically connected, and the communication may be established with the image-forming device in the wireless network.

After the target image-forming device is selected, when the mobile phone and the target image-forming device are in the same wireless network, that is, when the wireless network corresponding to the target image-forming device is consistent with the currently-connected wireless network, the communication may be directly established with the target image-forming device, thereby controlling the target image-forming device to perform the image-forming tasks.

When the mobile phone and the target image-forming device are in different wireless networks, that is, when the wireless network corresponding to the target image-forming device is not consistent with the currently-connected wireless network, the currently-connected wireless network may be disconnected, and the phone may be switched to connecting to the wireless network corresponding to the target image-forming device. The communication may be then established with the target image-forming device, thereby controlling the target image-forming device to perform the image-forming tasks.

The image-forming tasks may be printing documents, scanning documents, and the like according to different types of the image-forming devices.

In the technical solutions provided by one embodiment, the image-forming devices may be searched by acquiring the currently-available wireless networks, and when the wireless network is identified as the wireless network provided by the image-forming device, the network identifier for the wireless network may be directly acquired as the first network identifier representing the device identifier of the image-forming device; when the wireless network is identified as the wireless network not provided by the image-forming device, the connection may be established with the wireless network and then the device identifier of the image-forming device connected to the wireless network may be acquired as the first device identifier; and then the list of the image-forming devices including the first network identifier and the first device identifier may be established, the wireless network corresponding to the target image-forming device may be connected after selecting the target image-forming device from the list of the image-forming devices, and furthermore, the communication may be established with the target image-forming device, thereby controlling the target image-forming device to perform the image-forming tasks. Since the first network identifier can be directly acquired from the network identifier of the wireless network as the virtual device identifier of the image-forming device when the wireless network provided by the image-forming device is identified, there is no need to establish the connection with the wireless network to search the image-forming devices and acquire the device identifier, which may reduce the quantity of wireless network connection and disconnection and shorten the search time of the image-forming devices to improve efficiency.

Exemplary Embodiment Two

Based on the above-mentioned embodiment, the method for controlling the image-forming devices is optimized in one embodiment.

Figure 5:
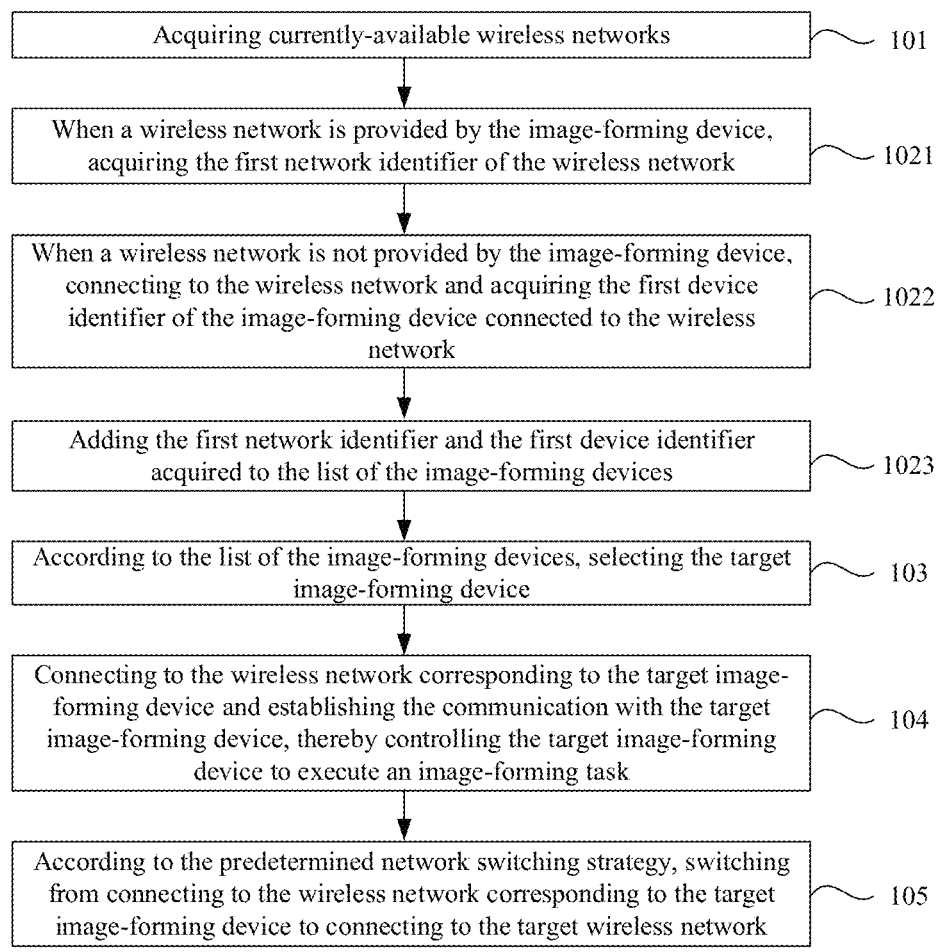
FIG. 5 illustrates a flow chart of a method for controlling image-forming devices provided by the exemplary embodiment two of the present disclosure.

FIG. 5 illustrates a flow chart of a method for controlling image-forming devices provided by the exemplary embodiment two of the present disclosure. As shown in FIG. 5, the method provided in one embodiment may include the following.

At step 101, the currently-available wireless networks may be acquired.

At step 1021, when the wireless network is provided by the image-forming device, the first network identifier of the wireless network may be acquired.

At step 1022, when the wireless network is not provided by the image-forming device, the wireless network may be connected, and the first device identifier of the image-forming device connected to the wireless network may be acquired.

At step 1023, the first network identifier and the first device identifier acquired may be added to the list of the image-forming devices.

At step 103, the target image-forming device may be selected according to the list of the image-forming devices.

At step 104, the wireless network corresponding to the target image-forming device may be connected, and the communication may be established with the target image-forming device, thereby controlling the target image-forming device to execute image-forming tasks.

The implementation manner of the above-mentioned steps from 101 to 104 may refer to the above-mentioned embodiments of the present disclosure, which may not be described in detail in one embodiment.

In order to establish the communication with the target image-forming device, the mobile phone is required to be continuously connected to the wireless network corresponding to the target image-forming device. In the existing technology, the mobile phone may not automatically switch the wireless network even after the image-forming task is executed but keep connecting to the wireless network corresponding to the target image-forming device. Especially, when the target image-forming device is the hotspot image-forming device, other operations such as connecting to the Internet and the like may only be implemented by switching to other wireless networks. The user may have to exit the application program of the target image-forming device, then start other application programs of the mobile phone and switch the wireless networks in other application programs, which may have poor operation convenience.

In order to solve the above-mentioned problem, after step 104 is executed, the connected wireless network may be switched from the wireless network corresponding to the target image-forming device to the target wireless network in one embodiment, that is, step 105 is executed, such that the network switching may be implemented in the application program of the current target image-forming device, which may improve the operation convenience.

At step 105, according to a predetermined network switching strategy, connecting to the wireless network corresponding to the target image-forming device may be switched to connecting to a target wireless network.

The target wireless network may be the wireless network connected to the mobile phone before step 104 is executed, also be the wireless network selected by the user, and also be the wireless network automatically selected by the mobile phone.

For example, the target wireless network may be the wireless network connected to the mobile phone before step 104 is executed, so that before executing step 101, the network identifier of the currently-connected wireless network may be recorded as a second network identifier, for example, recorded and saved in the storage space of the mobile phone.

After the step 104 is executed, the second network identifier may first be acquired from the storage space of the mobile phone, and the wireless network corresponding to the second network identifier may be used as the target wireless network. Then, when the predetermined condition is satisfied, the wireless network corresponding to the target image-forming device is disconnected and the connection with the target wireless network may be established.

The predetermined condition may include one or more of the predetermined statuses of the image-forming tasks, whether the network switch is executed, or whether the currently-connected wireless network is the wireless network provided by the image-forming device.

The predetermined statuses of the image-forming tasks may be, by the user, exiting the application program, switching the application program to background run, completing the image-forming tasks such as printing by the image-forming devices, and cancellation, interruption and error of the image-forming tasks, and the like. When the image-forming device completes the image-forming tasks such as printing and the like, or when the image-forming tasks are cancelled, interrupted and errored and the like, a message may be sent to the user of the mobile phone to inform the user of the current operating status of the image-forming device in a pop-up window. When a certain predetermined status of the image-forming tasks is satisfied, the network may be automatically switched to the wireless network previously connected to the mobile phone. Furthermore, if the network switching is executed at step 104, that is, the network is switched from the currently-connected wireless network to the wireless network corresponding to the target image-forming device (indicating that the network is switched), after satisfying the predetermined status of the image-forming task, the wireless network corresponding to the target image-forming device may be disconnected, and the connection may be then established with the target wireless network. It may also be that when the predetermined status of the image-forming task is satisfied, whether the currently-connected wireless network is the wireless network provided by the image-forming device may be determined; and if "yes", the wireless network corresponding to the target image-forming device may be disconnected and the connection may be established with the target wireless network.

Or, the target wireless network may be the wireless network with the strongest communication signal in the currently-available wireless networks. The above-mentioned step 105 may be first acquiring the wireless network with the strongest signal in the wireless networks as the target wireless network, and when the predetermined condition is satisfied, the wireless network corresponding to the target image-forming device may be disconnected and the connection may be established with the target wireless network.

Or, the target wireless network may also be the wireless network formed by wireless routers in the currently-available wireless networks, or the wireless network capable of providing Internet service.

Or, when the predetermined condition is satisfied, the list of the wireless networks may be established. The list of the wireless networks may include the currently-available wireless networks and may be displayed on the mobile phone, such that the user may select a wireless network from the list of the wireless networks. When the wireless network selected by the user from the list of the wireless networks is acquired, the wireless network selected by the user may be used as the target wireless network, the wireless network corresponding to the target image-forming device may be disconnected, and the connection may be established with the wireless network selected by the user.

It should be noted that a configuration function in the application program of the image-forming device may be provided in advance for the user to preset that, when a certain predetermined condition is satisfied, a window may first pop up to prompt the user whether the wireless network is switched, and the mobile phone may execute the network switching operation according to the user's selection; or, the user may preset the immediate execution of the network switching operation when exiting the application program; or the user may preset the execution of the network switching operation when the received task execution status fed back by the image-forming device is a completed status; or the user may preset other functions, such that corresponding operations may be implemented by the mobile phone according to the functions preset by the user.

Exemplary Embodiment Three

Based on the above-mentioned embodiment, the method for controlling the image-forming devices is optimized in one embodiment.

After each communication with the image-forming device, the related information of the image-forming device may be recorded in the storage space of the mobile phone as history record. When the user starts the application program of the image-forming device, the image-forming device in the history record may be automatically acquired and whether the image-forming device is capable of connecting normally may be determined. If "yes", the communication may be directly established with the image-forming device, thereby controlling the image-forming device to execute the image-forming tasks without executing steps from 101 to 104 to improve efficiency.

Figure 6:
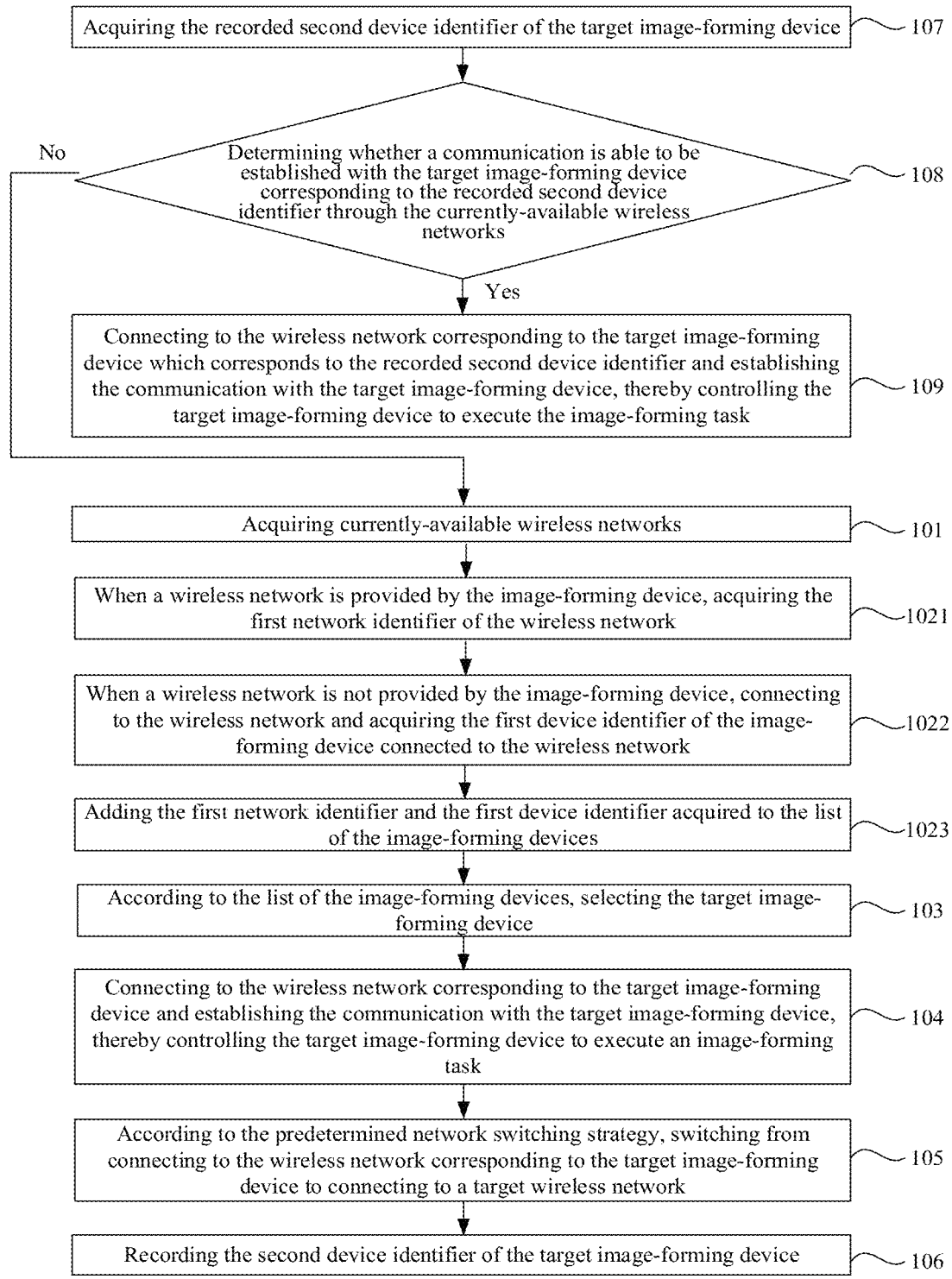
FIG. 6 illustrates a flow chart of a method for controlling image-forming devices provided by the exemplary embodiment three of the present disclosure.

Specifically, FIG. 6 illustrates a flow chart of a method for controlling image-forming devices provided by the exemplary embodiment three of the present disclosure. As shown in FIG. 6, the following steps may be executed after step 104.

At step 106, a second device identifier of the target image-forming device may be recorded.

Step 106 may be executed before or after step 105. In one embodiment, step 106 may be executed after step 105.

Then, when the application program of the image-forming device is used next time, the following steps may be executed first.

At step 107, the recorded second device identifier of the target image-forming device may be acquired.

At step 108, whether a communication is able to be established with the target image-forming device corresponding to the recorded second device identifier through the currently-available wireless networks may be determined.

Whether the mobile phone is capable of searching the target image-forming device corresponding to the recorded second device identifier through the currently-available wireless networks may be actually determined at step 108. When the target image-forming device corresponding to the second device identifier and the mobile phone can establish the communication in any one wireless network in the currently-available wireless networks, step 109 may be executed.

At step 109, the wireless network corresponding to the target image-forming device which corresponds to the recorded second device identifier may be connected, and the communication may be established with the target image-forming device, thereby controlling the target image-forming device to execute image-forming tasks.

If the target image-forming device cannot be connected through the currently-available wireless networks, steps from 101 to 104 may be executed sequentially.

At step 108, the communication module in the mobile phone may search whether the target image-forming device exists in the history record through the currently-available wireless network; and if the target image-forming device is identified in the history record, it indicates that normal communication may be performed with the target image-forming device. Specifically, when the currently-available wireless network is the wireless network provided by a non-image-forming device, the communication module of the mobile phone may search whether an image-forming device as same as the recorded target image-forming device exists by connecting to the wireless network; and if the image-forming device exists, the determination result of step 108 is "yes". For the wireless network provided by the image-forming device, whether the network identifier of the wireless network includes the recorded second device identifier may be compared; and if "yes", it indicates that the recorded target image-forming device may currently establish direct communication with the mobile phone. Or, for the wireless network provided by the image-forming device, the communication module of the mobile phone may also establish the connection with the wireless network to search whether an image-forming device as same as the recorded target image-forming device exists. Therefore, at step 108, the target image-forming device in the history record may be identified or searched according to the existing wireless network. If the target image-forming device in the history record can be identified or searched, it determines that the communication may be established with the target image-forming device in the history record.

At step 109, the wireless network corresponding to the target image-forming device which corresponds to the recorded second device identifier may be connected, and the wireless network may be the wireless network currently corresponding to the recorded target image-forming device. The wireless network currently corresponding to the recorded target image-forming device may be the last connected wireless network, or also be the wireless network provided by the target image-forming device in the history record, or also be the existing wireless network, which is reconnected by the target image-forming device in the history record, different from the last connected wireless network.

Exemplary Embodiment Four

Based on the above-mentioned embodiment, the method for controlling the image-forming devices is optimized in one embodiment.

Figure 7:
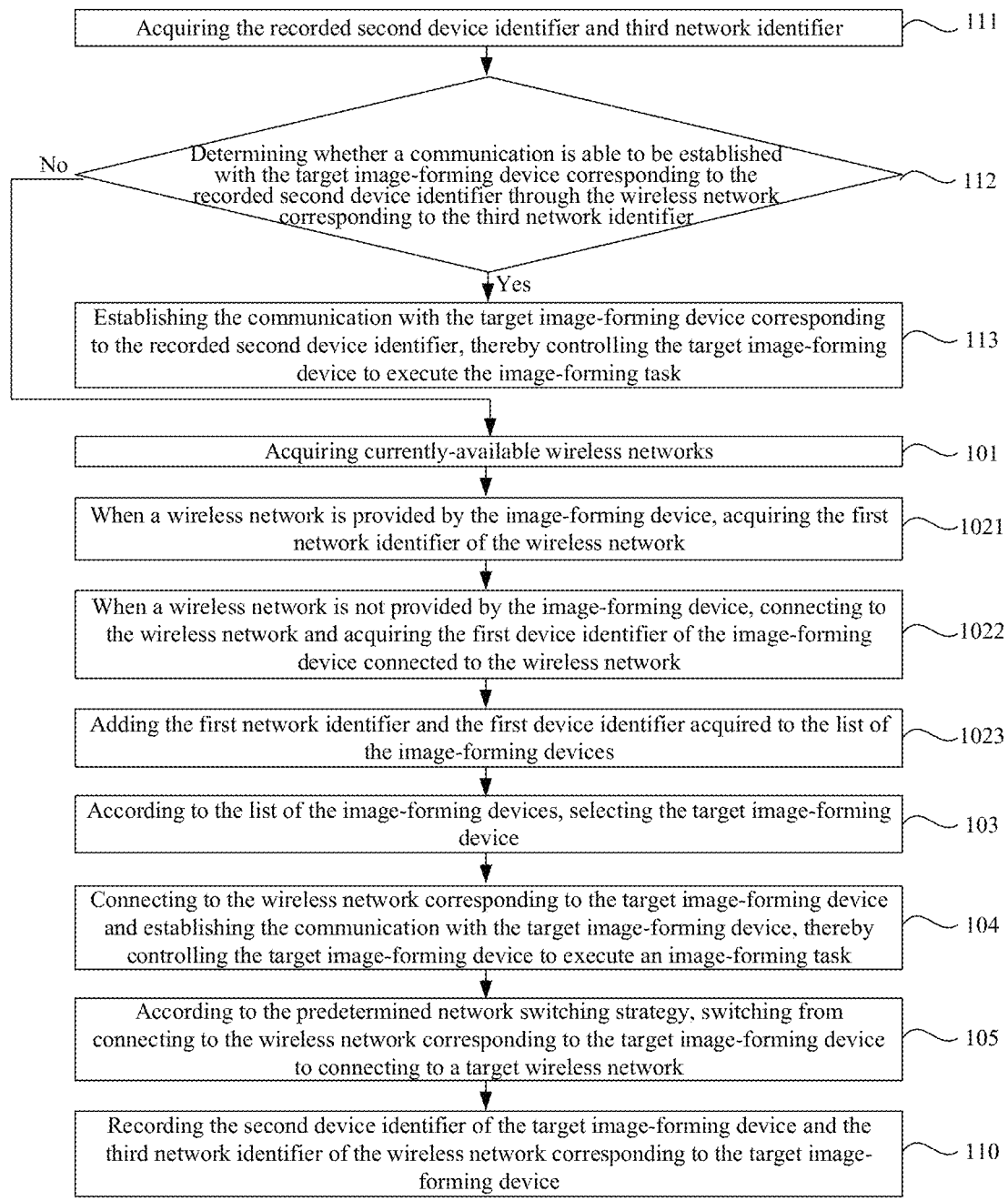
FIG. 7 illustrates a flow chart of a method for controlling image-forming devices provided by the exemplary embodiment four of the present disclosure.

Specifically, FIG. 7 illustrates a flow chart of a method for controlling image-forming devices provided by the exemplary embodiment four of the present disclosure. As shown in FIG. 7, the following steps may be executed after step 104.

At step 110, the second device identifier of the target image-forming device and a third network identifier of the wireless network corresponding to the target image-forming device may be recorded.

Step 110 may be executed before or after step 105. Step 110 may be executed after step 105 in one embodiment.

Then, when the application program of the image-forming device is used next time, the following steps may be executed first.

At step 111, the second device identifier and the third network identifier recorded may be acquired.

At step 112, whether the communication is established with the target image-forming device corresponding to the recorded second device identifier through the wireless network corresponding to the third network identifier may be determined.

Step 112 may be implemented using the following manner.

The mobile phone needs to acquire the currently-available wireless networks first, and the connection may be established with the wireless network when the existence of the wireless network corresponding to the third network identifier is identified. If the wireless network corresponding to the third network identifier (the first case that the determination result of step 112 is "no") does not exist, return to execute step 101 or directly execute step 102.

After identifying the existence of the wireless network corresponding to the third network identifier and establishing the connection with the wireless network, whether the target image-forming device corresponding to the recorded second device identifier is connected to the wireless network corresponding to the third network identifier. If "yes" (the determination result of step 112 is "yes"), execute step 113.

At step 113, the communication may be established with the target image-forming device corresponding to the recorded second device identifier, thereby controlling the target image-forming device to execute the image-forming tasks.

After identifying the existence of the wireless network corresponding to the third network identifier and establishing the connection with the wireless network, steps from 101 to 104 may be proceeded when it is determined that the target image-forming device corresponding to the recorded second device identifier is not in the wireless network (the second case that the determination result of step 112 is "no"). Therefore, when the determination result of step 112 is "no", the following cases may be included: the wireless network corresponding to the third network identifier may not currently exist; even if the wireless network corresponding to the third network identifier currently exists, the recorded target image-forming device may have changed the connected wireless network, from connecting to the wireless network corresponding to the third network identifier to connecting to other wireless network different from the wireless network corresponding to the third network identifier. Therefore, at step 112 in one embodiment, it may only determine that whether the communication is established with the recorded target image-forming device through the wireless network corresponding to the third network identifier. If the determination result is "no", then proceed to steps from 101 to 104. Therefore, it is possible that when the first device identifier corresponding to the searched image-forming device is identified to be same as the recorded second device identifier during searching the image-forming devices executed at step 102, the recorded target image-forming device may be automatically selected as the target image-forming device at step 103, and the wireless network currently corresponding to the recorded target image-forming device may be automatically connected, and the communication may be established with the recorded target image-forming device at step 104, thereby controlling the target image-forming device to execute the image-forming tasks. That is, when the determination result of step 112 is "no", there are two types of processing for entering steps from 101 to 104. The first processing is that it is necessary to search the existing wireless networks for the image-forming devices according to the above-mentioned embodiments and then select the target image-forming device according to the list of the image-forming devices which may not include the recorded device identifier of the target image-forming device. The second processing is that if the first device identifier as same as the recorded second device identifier is searched and identified at step 102, the recorded target image-forming device may be automatically selected as the current target image-forming device at step 103, rather than selecting the target image-forming device required by the user manually or by the communication intensity, as in the above-mentioned embodiments. Or, the image-forming device in the history record may not be automatically selected at step 103, but the searched second device identifier in the record may be highlighted in the list of the image-forming devices at step 102, such that the user is allowed to identify and select the image-forming device which has been used last time.

It should be noted that after establishing the communication with the image-forming device each time, the corresponding information of the image-forming device of the current connection may be recorded, and the corresponding information of the image-forming device recorded last time may be overridden.

Or, the corresponding information of the image-forming device recorded last time may not be overridden, which is equivalent to that the history record may include the information of multiple image-forming devices which have been connected. The history record list may be established, such that the user may directly select an image-forming device in the history record list. After determining that the normal communication with the image-forming device selected by the user can be performed, the communication is established with the image-forming device to improve convenience. When the normal communication with the image-forming device selected by the user cannot be performed, a window may pop up to prompt the user to change the image-forming device.

Optionally, the communication statuses of the image-forming devices in the history record may be determined first, and the image-forming devices capable of establishing the normal communication connection may be added to the history record list.

In one embodiment, when the user starts the application program, a selection screen may first be provided for the user to choose from automatic connection of the image-forming device or manual connection of the image-forming device. If the user chooses the automatic connection, the image-forming device with normal communication may be selected from the history record to establish the connection, or the currently-available hotspot image-forming device may be acquired to establish the connection. If the user chooses the manual connection, the history record list may be provided to the user first. If the user selects an image-forming device from the history record list, the connection may be established with the image-forming device. If the user refuses to select the image-forming device from the history record list, step 101 may be executed to acquire the currently-available wireless networks, searching for the image-forming device in each wireless network and acquiring the first network identifier of the wireless network provided by the image-forming device may be implemented, and the list of the image-forming devices may be established. In the list of the image-forming devices, certain identification may be added to the virtual device identifiers (e.g., the first network identifier) of the image-forming devices or the image-forming devices which have been connected previously. For example, the identification may be displayed in different color fonts or small fonts, such as "recently used", "hot spot", "direct connection", and the like, such that the user may conveniently choose suitable image-forming devices.

Exemplary Embodiment Five

Figure 8:
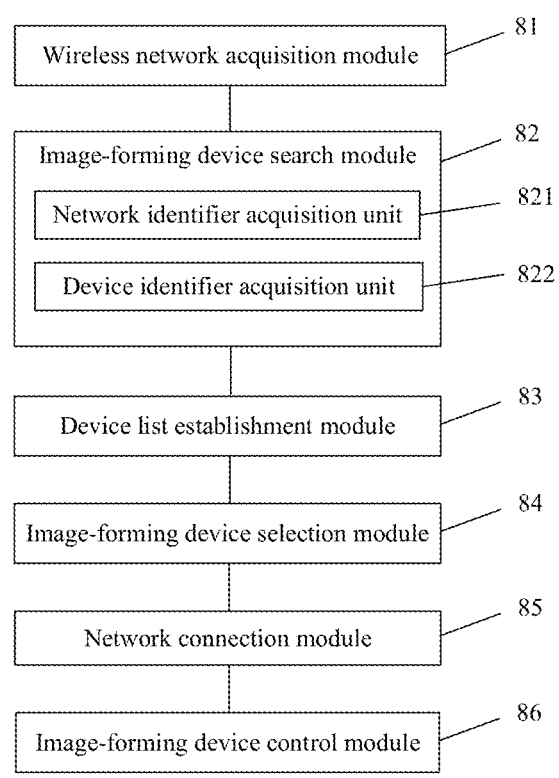
FIG. 8 illustrates a structural schematic of a device for controlling image-forming devices provided by the exemplary embodiment five of the present disclosure.

FIG. 8 illustrates a structural schematic of a device for controlling image-forming devices provided by the exemplary embodiment five of the present disclosure. As shown in FIG. 8, the device for controlling the image-forming devices, provided in one embodiment, may include a wireless network acquisition module 81, an image-forming device search module 82, a device list establishment module 83, an image-forming device selection module 84, a network connection module 85, and an image-forming device control module 86.

The wireless network acquisition module 81 may be configured to acquire the currently-available wireless networks. The image-forming device search module 82 may be configured to search image-forming devices through the wireless networks. The device list establishment module 83 may be configured to establish a list of the image-forming devices. The image-forming device selection module 84 may be configured to select a target image-forming device according to the list of the image-forming devices. The network connection module 85 may be configured to connect a wireless network corresponding to the target image-forming device. The image-forming device control module 86 may be configured to establish a communication with the target image-forming device, thereby controlling the target image-forming device to execute image-forming tasks.

The image-forming device search module 82 may include a network identifier acquisition unit 821 and a device identifier acquisition unit 822, where the network identifier acquisition unit 821 may be configured to acquire a first network identifier of the wireless network when the wireless network is provided by the image-forming device; and the device identifier acquisition unit 822 may be configured to, when the wireless network is not provided by the image-forming device, connect the wireless network and acquire the first device identifier of the image-forming device connected to the wireless network.

The above-mentioned device list establishment module 83 may be configured to add the first network identifier and the first device identifier acquired to the list of the image-forming devices.

In the technical solutions provided by one embodiment, the image-forming devices may be searched by acquiring the currently-available wireless networks, and when the wireless network is identified as the wireless network provided by the image-forming device, the network identifier for the wireless network may be directly acquired as the first network identifier representing the device identifier of the virtual image-forming device; when the wireless network is identified as the wireless network not provided by the image-forming device as an access point, the connection may be established with the wireless network and then the device identifier of the image-forming device connected to the wireless network may be acquired as the first device identifier; and then the list of the image-forming devices including the first network identifier and the first device identifier may be established, the wireless network corresponding to the target image-forming device may be connected after selecting the target image-forming device from the list of the image-forming devices, and the communication may further be established with the target image-forming device to control the target image-forming device to perform the image-forming tasks. Since the first network identifier can be directly acquired from the broadcast message of the wireless network as the virtual device identifier when the wireless network provided by the image-forming device is identified, there is no need to establish the connection with the wireless network, which may reduce the quantity of wireless network connection and disconnection and shorten the search time of the image-forming devices to improve efficiency.

Figure 9:
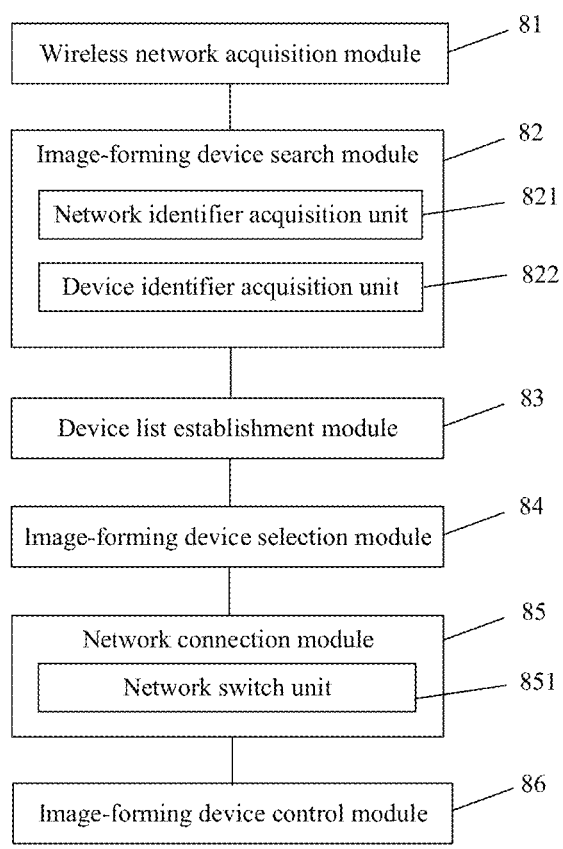
FIG. 9 illustrates another structural schematic of a device for controlling image-forming devices provided by the exemplary embodiment five of the present disclosure.

FIG. 9 illustrates another structural schematic of the device for controlling image-forming devices provided by the exemplary embodiment five of the present disclosure. Furthermore, as shown in FIG. 9, the network connection module 85 may include a network switch unit 851, which is configured to, when the wireless network corresponding to the target image-forming device is not consistent with the currently-connected wireless network, disconnect the currently-connected wireless network and switch to connecting to the wireless network corresponding to the target image-forming device.

Figure 10:
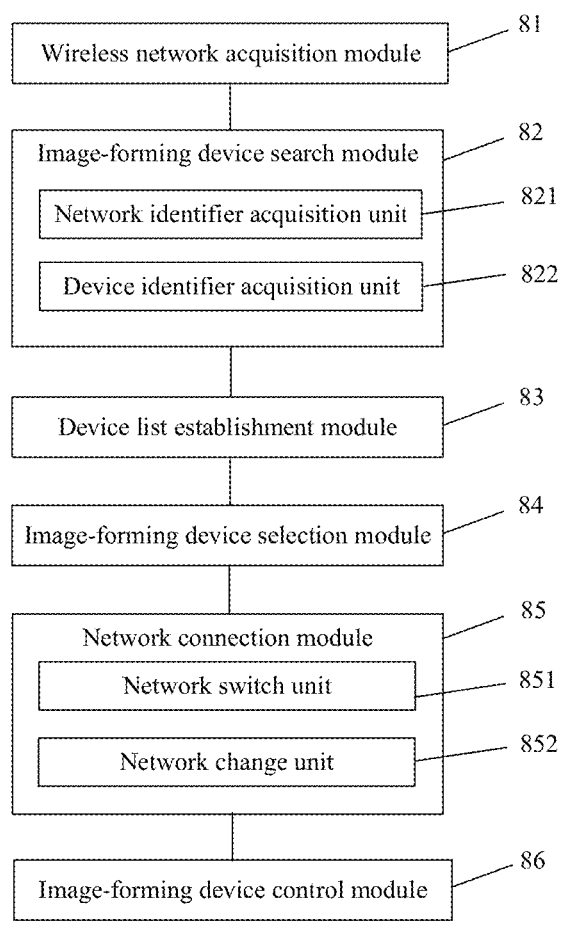
FIG. 10 illustrates another structural schematic of a device for controlling image-forming devices provided by the exemplary embodiment five of the present disclosure.

FIG. 10 illustrates another structural schematic of the device for controlling image-forming devices provided by the exemplary embodiment five of the present disclosure. As shown in FIG. 10, the network connection module 85 may further include a network change unit 852, which is configured to, according to the predetermined network switching strategy, switch from connecting to the wireless network corresponding to the target image-forming device to connecting to the target wireless network.

Figure 11:
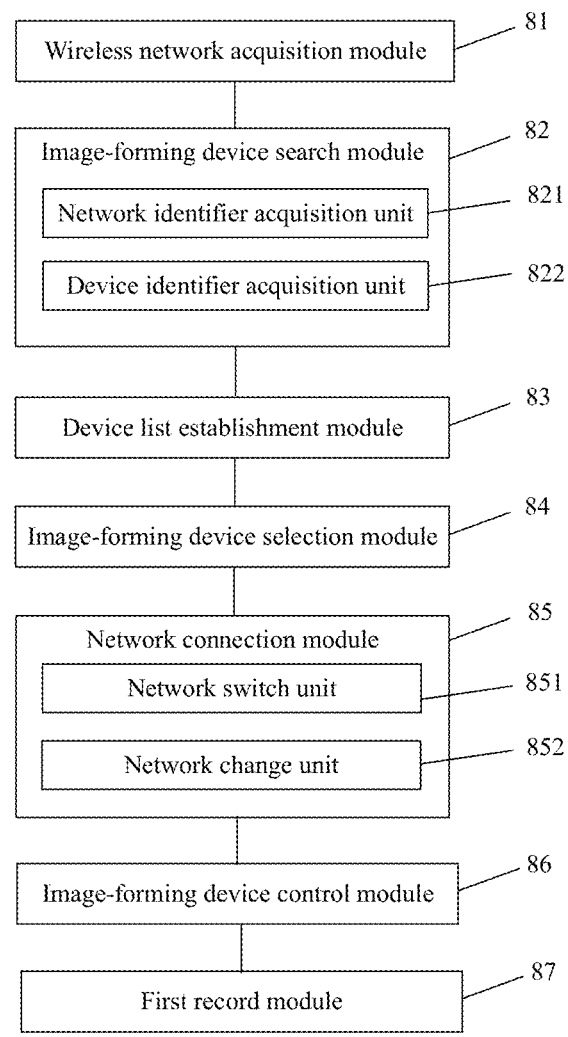
FIG. 11 illustrates another structural schematic of a device for controlling image-forming devices provided by the exemplary embodiment five of the present disclosure.

FIG. 11 illustrates another structural schematic of the device for controlling image-forming devices provided by the exemplary embodiment five of the present disclosure. Furthermore, as shown in FIG. 11, the device for controlling the image-forming device may further include a first record module 87 which is configured to record the second network identifier of the currently-connected wireless network before searching the image-forming devices. Then, the above-mentioned network change unit 852 may be specifically configured to acquire the wireless network corresponding to the currently-recorded second network identifier as the target wireless network; and when the predetermined condition is satisfied, disconnect the wireless network connection corresponding to the target image-forming device and establish the connection with the target wireless network.

Or, the network change unit 852 may be specifically configured to acquire the wireless network with the strongest signal in all wireless networks as the target wireless network; and when the predetermined condition is satisfied, disconnect the wireless network connection corresponding to the target image-forming device and establish the connection with the target wireless network.

Or, the network change unit 852 may be specifically configured to establish and display the list of the wireless networks when the predetermined condition is satisfied, where the list of the wireless networks may include the currently-available wireless networks; acquire the wireless network selected by the user from the list of the wireless networks as the target wireless network; and disconnect the wireless network connection corresponding to the target image-forming device and establish the connection with the target wireless network.

Figure 12:
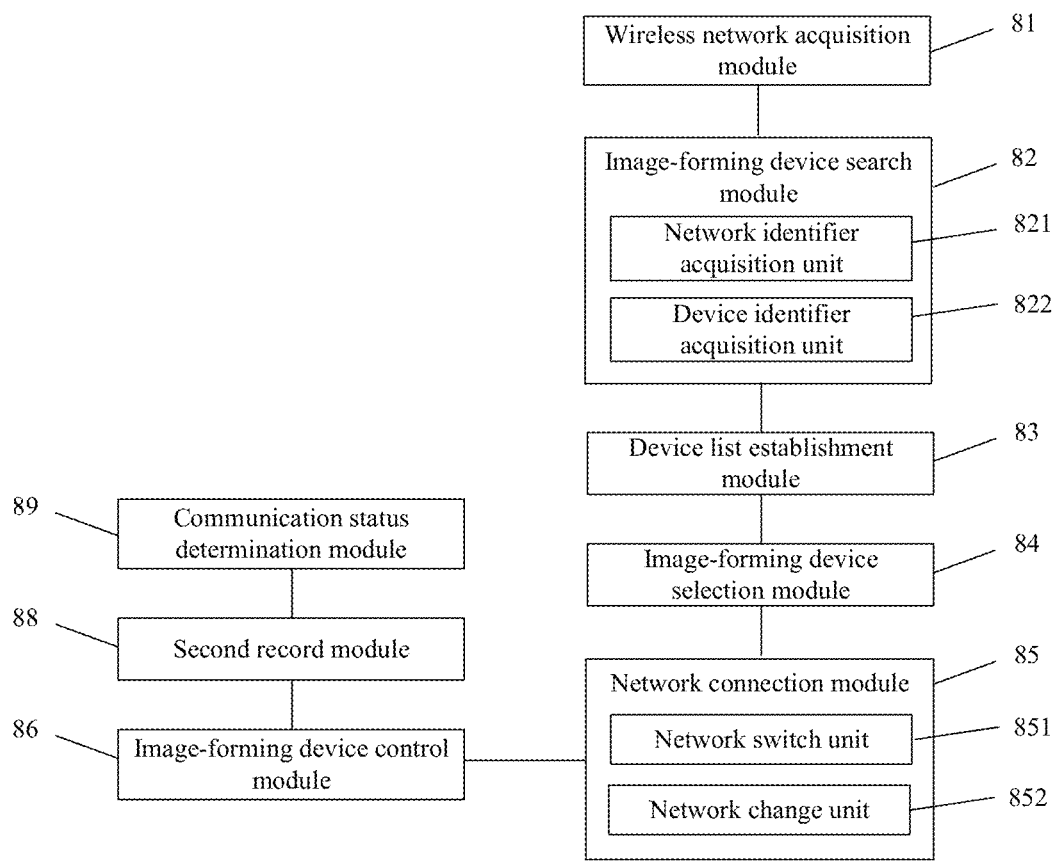
FIG. 12 illustrates another structural schematic of a device for controlling image-forming devices provided by the exemplary embodiment five of the present disclosure.

FIG. 12 illustrates another structural schematic of the device for controlling image-forming devices provided by the exemplary embodiment five of the present disclosure. Furthermore, as shown in FIG. 12, the device for controlling the image-forming device may further include a second record module 88 and a communication status determination module 89. The second record module 88 may be configured to record the second device identifier of the target image-forming device and the third network identifier of the wireless network corresponding to the target image-forming device. The communication status determination module 89 may be configured to determine whether the communication is able to be established with the target image-forming device corresponding to the recorded second device identifier through the wireless network corresponding to the third network identifier before searching the image-forming devices. When the determination result is "yes", the communication may be established with the target image-forming device corresponding to the recorded second device identifier to trigger the operations of the image-forming device control module 86 and the network connection module 85; and when the determination result is "no", the modules 81-86 may operate. In addition, when the determination result of the communication status determination module 89 is "no", it is possible that the recorded target image-forming device may have changed the connected wireless network to other wireless networks different from the wireless network corresponding to the second network identifier. Therefore, when the determination result of the communication status determination module 89 is "no", it is possible that the device list establishment module 83 may identify that the first device identifier corresponding to the searched image-forming device is same as the recorded second device identifier; the image-forming device selection module 84 may automatically select the recorded target image-forming device as the target image-forming device; the network connection module 85 may automatically connect the wireless network currently corresponding to the recorded target image-forming device; and the image-forming device control module 86 may establish the communication with the recorded target image-forming device, thereby controlling the target image-forming device to execute the image-forming tasks.

Furthermore, in one embodiment, the second record module 88 may also be configured to record the second device identifier of the target image-forming device. The communication status determination module 89 may be configured to determine whether the communication is able to be established with the target image-forming device corresponding to the recorded second device identifier through the currently-available wireless networks before searching the image-forming devices. When the determination result is "yes", the network connection module 85 may connect the wireless network currently corresponding to the recorded target image-forming device, and the image-forming device control module 86 may establish the communication with the target image-forming device corresponding to the recorded device identifier; and when the determination result is "no", the modules 81-86 may operate.

Exemplary Embodiment Six

Figure 13:
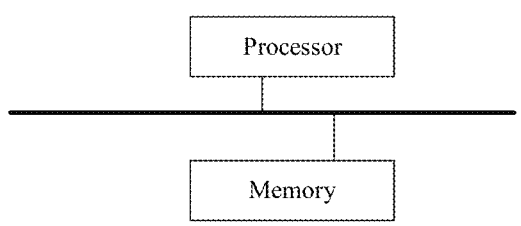
FIG. 13 illustrates a structural schematic of an electronic terminal provided by the exemplary embodiment six of the present disclosure.

FIG. 13 illustrates a structural schematic of an electronic terminal provided by the exemplary embodiment six of the present disclosure. As shown in FIG. 13, the electronic terminal provided in one embodiment may include a memory, a processor, and a computer program.

The computer program may be stored in the memory and configured to be executed by the processor to implement the method provided in any of the above-mentioned embodiments.

Moreover, a computer-readable storage medium is provided in one embodiment, where the storage medium may store a computer program. The computer program may be executed by a processor to implement the method provided in any of the above-mentioned embodiments.

In the description of the present disclosure, it should be understood that the terms "first" and "second" are merely used for descriptive purposes and cannot be understood as indicating or implying relative importance or implicitly indicating the number of indicated technical features. Thus, the features defined with "first" and "second" may explicitly or implicitly include one or more of these features. In the description of the present disclosure, "a plurality of" means at least two, such as two, three, and the like, unless otherwise specifically defined.

Those skilled in the art should understand that all or part of the steps in the above-mentioned method embodiments can be implemented by a program instructing relevant hardware. The above-mentioned program may be stored in a computer readable storage medium. When the program is executed, it executes the steps included in the above-mentioned method embodiments. The above-mentioned storage media may include a U disk, a mobile hard disk, a read-only memory (ROM), a random-access memory (RAM), a magnetic disk or an optical disk, and other media which may store program code.

It should be noted that the above-mentioned embodiments may merely be used to illustrate the technical solutions of the present disclosure and may not be intended to limit the present disclosure. Although the present disclosure is described in detail with reference to the above-mentioned embodiments, those skilled in the art should understand that the technical solutions recorded in the above-mentioned embodiments may still be modified, or certain or all of the technical features may be equivalently replaced. However, such modifications or replacements may not cause the essence of the corresponding technical solutions to depart from the scope of the technical solutions of the embodiments of the present disclosure.

What is claimed is:

1. A method for controlling image-forming devices, comprising:

acquiring currently-available wireless networks, including detecting, by a wireless communication module in a mobile phone, the currently-available wireless networks, and acquiring, by the wireless communication module in the mobile phone, broadcast information transmitted by each wireless access point corresponding to the currently-available wireless networks;

searching image-forming devices through the currently-available wireless networks and establishing a list of the image-forming devices; according to the list of the image-forming devices, selecting a target image-forming device; and connecting to a wireless network corresponding to the target image-forming device and establishing a communication with the target image-forming device, thereby controlling the target image-forming device to execute an image-forming task;

wherein searching the image-forming devices through the currently-available wireless networks and establishing the list of the image-forming devices include: when one of the currently-available wireless networks is provided by an image-forming device, acquiring a first network identifier of the wireless network;

when one of the currently-available wireless networks is not provided by the image-forming device, connecting to the one of the currently-available wireless networks and acquiring the first device identifier of the image-forming device of the wireless network; and adding the first network identifier and the first device identifier acquired to the list of the image-forming devices.

2. The method according to claim 1, wherein connecting to the wireless network corresponding to the target image-forming device includes:

when the wireless network corresponding to the target image-forming device is not consistent with a currently-connected wireless network, disconnecting the currently-connected wireless network and switching to connecting to the wireless network corresponding to the target image-forming device.

3. The method according to claim 1, further including:
according to a predetermined network switching strategy, switching from connecting to the wireless network corresponding to the target image-forming device to connecting to a target wireless network.

4. The method according to claim 3, before searching the image-forming devices, further including:

recording a second network identifier of the currently-connected wireless network, wherein according to the predetermined network switching strategy, switching from connecting to the wireless network corresponding to the target image-forming device to connecting to the target wireless network includes:

acquiring a wireless network corresponding to a currently-recorded second network identifier as the target wireless network;

when a predetermined condition is satisfied, disconnecting the wireless network corresponding to the target image-forming device; and establishing a connection with the target wireless network.

5. The method according to claim 3, wherein according to the predetermined network switching strategy, switching from connecting to the wireless network corresponding to the target image-forming device to connecting to the target wireless network includes:

acquiring a wireless network with a strongest signal in all wireless networks as the target wireless network;

when a predetermined condition is satisfied, disconnecting the wireless network corresponding to the target image-forming device; and establishing a connection with the target wireless network.

6. The method according to claim 3, wherein according to the predetermined network switching strategy, switching from connecting to the wireless network corresponding to the target image-forming device to connecting to the target wireless network includes:

when a predetermined condition is satisfied, establishing and displaying the list of the wireless networks, wherein the list of the wireless networks includes the currently-available wireless networks;

acquiring a wireless network selected by a user from the list of the wireless networks as the target wireless network;

disconnecting the wireless network corresponding to the target image-forming device; and establishing a connection with the target wireless network.

7. The method according to claim 1, further including:
recording a second device identifier of the target image-forming device; and before searching the image-forming devices, further including:

determining whether a communication is able to be established with the target image-forming device corresponding to the recorded second device identifier through the currently-available wireless networks; and when a determination result is "yes", connecting to the wireless network corresponding to the target image-forming device which corresponds to the recorded second device identifier and establishing a communication with the target image-forming device corresponding to the recorded second device identifier, thereby controlling the target image-forming device to execute the image-forming task; and when the determination result is "no", executing an operation of searching the image-forming devices.

8. The method according to claim 1, further including:
recording a second device identifier of the target image-forming device and a third network identifier of the wireless network corresponding to the target image-forming device; and before searching the image-forming devices, further including:

determining whether a communication is able to be established with the target image-forming device corresponding to the recorded second device identifier through the wireless network corresponding to the third network identifier; and when a determination result is "yes", establishing the communication with the target image-forming device corresponding to the recorded second device identifier through the wireless network corresponding to the third network identifier, thereby controlling the target image-forming device to execute the image-forming task; and when the determination result is "no", starting acquiring the currently-available wireless networks and executing an operation of searching the image-forming devices through the currently-available wireless networks; and when the first device identifier corresponding to a searched image-forming device in the established list of the image-forming devices is identified to be same as the recorded second device identifier, automatically selecting the recorded target image-forming device as the target image-forming device from selected target image-forming devices.

9. An electronic terminal, comprising:
a memory, for storing a computer program; and
a processor, coupled to the memory and, when the computer program being executed, configured to:
acquire currently-available wireless networks, including detect, by a wireless communication module in a mobile phone, the currently-available wireless networks, and acquire, by the wireless communication module in the mobile phone, broadcast information transmitted by each wireless access point corresponding to the currently-available wireless networks;
search image-forming devices through the currently-available wireless networks, and establish a list of the image-forming devices, by performing:
when one of the currently-available wireless networks is provided by an image-forming device, acquiring a first network identifier of the wireless network;
when one of the currently-available wireless networks is not provided by the image-forming device, connecting to the one of the currently-available wireless networks and acquiring the first device identifier of the image-forming device of the wireless network; and adding the first network identifier and the first device identifier acquired to the list of the image-forming devices;
according to the list of the image-forming devices, select a target image-forming device;
connect to a wireless network corresponding to the target image-forming device; and
establish a communication with the target image-forming device, thereby controlling the target image-forming device to execute an image-forming task.

10. The terminal according to claim 9, wherein the processor is further configured to:
when the wireless network corresponding to the target image-forming device is not consistent with a currently-connected wireless network, disconnect the currently-connected wireless network and switch to connecting to the wireless network corresponding to the target image-forming device.

11. The terminal according to claim 9, wherein the processor is further configured to:
according to a predetermined network switching strategy, switch from connecting to the wireless network corresponding to the target image-forming device to connecting to a target wireless network.

12. The terminal according to claim 11, wherein the processor is further configured to:
before searching the image-forming devices, record a second network identifier of the currently-connected wireless network; and
acquire a wireless network corresponding to a currently-recorded second network identifier as the target wireless network; when a predetermined condition is satisfied, disconnect the wireless network corresponding to the target image-forming device; and establish a connection with the target wireless network.

13. The terminal according to claim 11, wherein the processor is further configured to:
acquire a wireless network with a strongest signal in all wireless networks as the target wireless network;
when a predetermined condition is satisfied, disconnect the wireless network corresponding to the target image-forming device; and establish a connection with the target wireless network.

14. The terminal according to claim 11, wherein the processor is further configured to:
when a predetermined condition is satisfied, establish and display the list of the wireless networks, wherein the list of the wireless networks includes the currently-available wireless networks;
acquire a wireless network selected by a user from the list of the wireless networks as the target wireless network; and
disconnect the wireless network corresponding to the target image-forming device and establish a connection with the target wireless network.

15. The terminal according to claim 9, wherein the processor is further configured to:
record a second device identifier of the target image-forming device and a third network identifier of the wireless network corresponding to the target image-forming device; and
before searching the image-forming devices,
determine whether a communication is able to be established with the target image-forming device corresponding to the recorded second device identifier through the wireless network corresponding to the third network identifier, and
when a determination result is "yes", establish the communication with the target image-forming device corresponding to the recorded second device identifier through the wireless network corresponding to the third network identifier, thereby controlling the target image-forming device to execute the image-forming task; and
when the determination result is "no", start acquiring the currently-available wireless networks and execute an operation of searching the image-forming devices through the currently-available wireless networks; and
when the first device identifier corresponding to a searched image-forming device in the established list of the image-forming devices is identified to be same as the recorded second device identifier, automatically select the recorded target image-forming device as the target image-forming device from selected target image-forming devices.

16. A non-transitory computer-readable storage medium, containing program instructions for, when executed by a processor, performing a method for controlling image-forming devices, the method comprising: acquiring currently-available wireless networks, including detecting, by a wireless communication module in a mobile phone, the currently-available wireless networks, and acquiring, by the wireless communication module in the mobile phone, broadcast information transmitted by each wireless access point corresponding to the currently-available wireless networks;
searching image-forming devices through the currently-available wireless networks and establishing a list of the image-forming devices; according to the list of the image-forming devices, selecting a target image-forming device; and
connecting to a wireless network corresponding to the target image-forming device and establishing a communication with the target image-forming device, thereby controlling the target image-forming device to execute an image-forming task;
wherein searching the image-forming devices through the currently-available wireless networks and establishing the list of the image-forming devices include:
when one of the currently-available wireless networks is provided by an image-forming device, acquiring a first network identifier of the wireless network;
when one of the currently-available wireless networks is not provided by the image-forming device, connecting to the one of the currently-available wireless networks and acquiring the first device identifier of the image-forming device of the wireless network; and
adding the first network identifier and the first device identifier acquired to the list of the image-forming devices.

17. The storage medium according to claim 16, wherein connecting to the wireless network corresponding to the target image-forming device includes:

when the wireless network corresponding to the target image-forming device is not consistent with a currently-connected wireless network, disconnecting the currently-connected wireless network and switching to connecting to the wireless network corresponding to the target image-forming device.

18. The storage medium according to claim 16, wherein the method further includes:

according to a predetermined network switching strategy, switching from connecting to the wireless network corresponding to the target image-forming device to connecting to a target wireless network.

19. The storage medium according to claim 18, wherein before searching the image-forming devices, the method further includes:

recording a second network identifier of the currently-connected wireless network, wherein according to the predetermined network switching strategy, switching from connecting to the wireless network corresponding to the target image-forming device to connecting to the target wireless network includes:

acquiring a wireless network corresponding to a currently-recorded second network identifier as the target wireless network;

when a predetermined condition is satisfied, disconnecting the wireless network corresponding to the target image-forming device; and establishing a connection with the target wireless network.

20. The storage medium according to claim 18, wherein according to the predetermined network switching strategy, switching from connecting to the wireless network corresponding to the target image-forming device to connecting to the target wireless network includes:

acquiring a wireless network with a strongest signal in all wireless networks as the target wireless network;

when a predetermined condition is satisfied, disconnecting the wireless network corresponding to the target image-forming device; and establishing a connection with the target wireless network.

* * * * *